June 29, 1954  J. E. CHELF  2,682,420
AUXILIARY OVERLOAD AXLE AND WHEEL ARRANGEMENT
Filed March 13, 1950  2 Sheets-Sheet 1
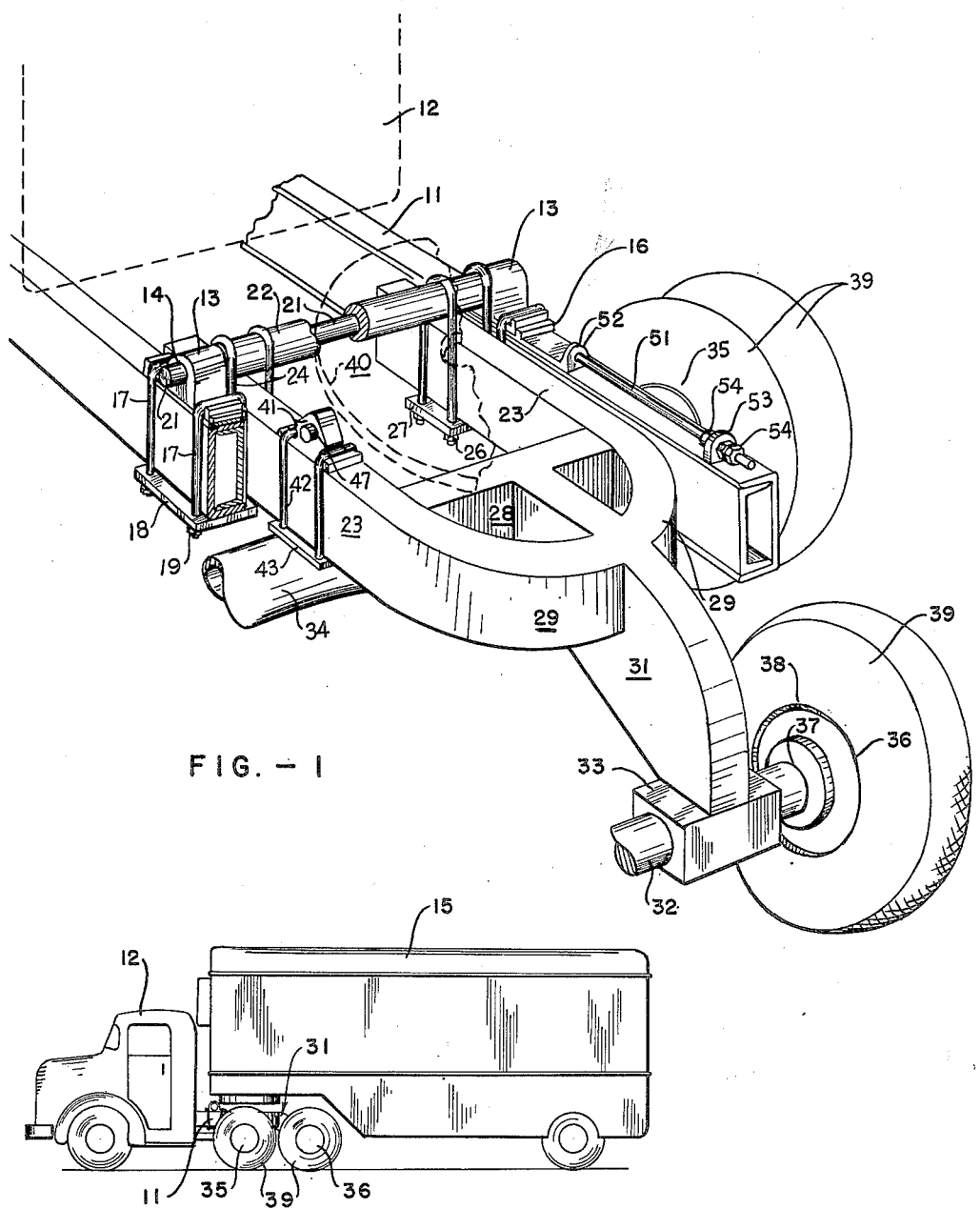
FIG.—1
FIG.—2
INVENTOR.
James E. Chelf
BY
ATTORNEY

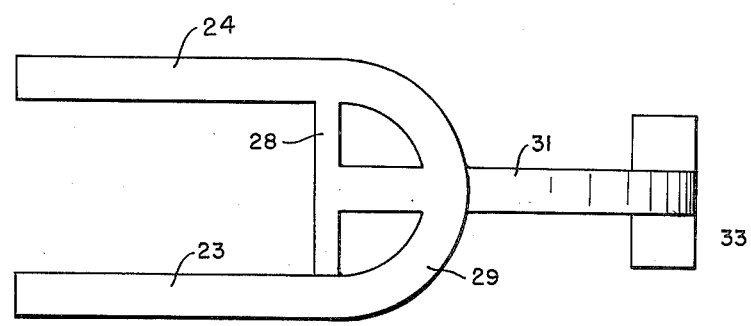
FIG.—4
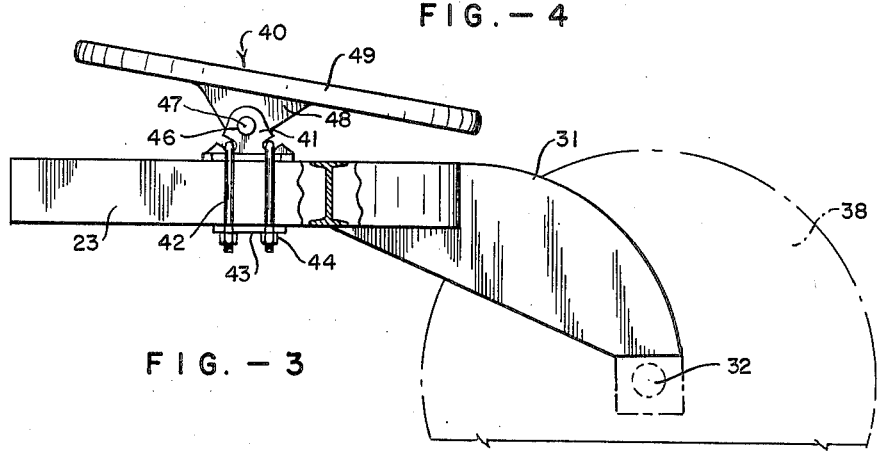
FIG.—3
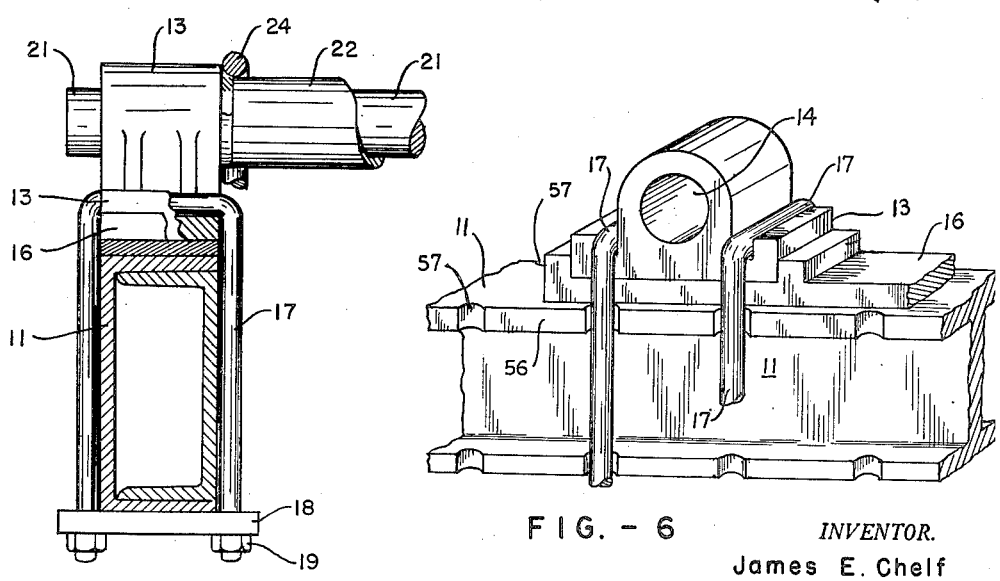
FIG.—5
FIG.—6
INVENTOR.
James E. Chelf
BY
ATTORNEY Patented June 29, 1954

2,682,420

UNITED STATES PATENT OFFICE 2,682,420

AUXILIARY OVERLOAD AXLE AND WHEEL ARRANGEMENT

James E. Chelf, Denver, Colo.

Application March 13, 1950, Serial No. 149,243

5 Claims. (Cl. 280—407)

This invention pertains to an auxiliary overload axle and wheel arrangement for transport vehicles and more particularly to an overload axle for trucks which may be readily attached or detached from the truck frame as desired.

Recent developments now make it possible for truck operators to pull larger trucks and carry heavier loads efficiently and at reduced expense. However, in many States the laws are so written that the operators are prevented from carrying the maximum possible pay load unless they provide their equipment with auxiliary wheels since in most instances the load limit is dependent on the number of load supporting axles or wheels.

Because it is often advantageous to operate at maximum possible loads, the operators have added auxiliary wheel arrangements to their trucks in order to comply with the specified requirements. In most instances compliance with the requirements has necessitated the use of a second axle of size and length comparable to the original drive axle of the tractor so that the auxiliary wheels could be placed in tandem arrangement with the original drive wheels. In general such previous arrangements have been costly to manufacture and install, and once installed they are difficult to remove. Accordingly they are not ordinarily removed even at times when their use is unnecessary. Because of this failure to remove the tires the expense of maintaining the running equipment on the truck or tractor is increased beyond the lesser amount that would be expended if the overload wheels were used only when necessary.

Being cognizant of the facts and circumstances related the present inventor has devised a new type of auxiliary wheel arrangement which is intended to solve some of the shortcomings of prior arrangements by satisfying the following objects:

To provide an auxiliary axle and wheels for use under overload conditions which may be readily attached to and removed from conventional transport vehicles.

To provide an overload wheel arrangement for transport vehicles the positioning of which may be adjusted with respect to other axles and wheels on the vehicle to increase or decrease the load on the auxiliary wheels as desired.

To provide an overload wheel arrangement for transport vehicles in which the position of the overload axle may be adjusted in minor increments to properly align the axle with respect to the vehicle frame and wheels.

To provide an overload wheel arrangement for transport trailer trucks in which the fifth wheel of the tractor is adjustably mounted on the separate frame which supports the overload axle.

To provide a frame mounting for overload wheels which may be pivotally secured to the frame of a transport vehicle in desired positions.

To provide an overload axle and wheel arrangement for transport vehicles of such size that the overload wheels will run out of track with respect to the drive wheels of the vehicle.

To provide an overload wheel arrangement of the foregoing type in which the drive wheels of the vehicle and the overload wheels may be placed in longitudinally overlapping position.

Further objects and advantages of the present invention will be apparent from the appended description and drawings in which:

Fig. 1 is a partial perspective view showing the overload wheel arrangement of this invention as secured to a tractor frame.

Fig. 2 is a side elevation showing the longitudinal placement of the overload wheels with respect to the other load supporting wheels of the vehicle.

Fig. 3 is a side elevation in partial section showing details of an overload wheel frame having a fifth wheel adjustably mounted thereon.

Fig. 4 is a plan view of the overload frame as shown in Fig. 3.

Fig. 5 is a detailed elevation in partial section showing an arrangement for pivotally attaching the overload wheels to the vehicle frame; and Fig. 6 is a perspective view showing details of a separate axle aligning arrangement in accordance with this invention.

Briefly stated the present invention provides an overload axle for transport vehicles upon which wheels are rotatably mounted to run in an out-of-track position with respect to other load supporting wheels of the vehicle. The overload axle and wheels are maintained in adjusted position by means of a separate frame which is pivotally secured to the frame of the vehicle. Additional provision is made for adjusting the longitudinal position of the overload wheels with respect to the vehicle frame and for adjusting the relative position of the trailer-engaging fifth wheel with respect to the overload frame which directly supports the fifth wheel. These adjustments provide for increasing or decreasing the percentage of the total weight that is to be carried by the overload axle and wheels. In addition to the main features set forth, means are provided for making minor adjustments in the longitudinal positioning of the overload frame support so as to assure correct alignment of the overload axle under operating conditions.

When the overload wheel arrangement of this invention is installed on a conventional tractor, the requirements of various State laws relative to the total loads to be distributed on each axle may be observed during loaded conditions and if desired the overload wheels may be removed or adjusted to positions out of contact with the road when their use is unnecessary.

Referring now to the drawings, the broad features of this invention are best shown in Fig. 1 where it will be noted that the frame members 11 of a conventional trailer pulling tractor 12 provide support for a trunnion 13 having an opening 14 therethrough. As shown in this figure the trunnion 13 rests in an adjusting block 16 placed on top of the frame 11. Hanger members or U-bolts 17 are provided to hold the trunnion 13 and adjusting block 16 in fixed relative position with respect to the frame 11 when plate 18 is moved into contact with the bottom edge of the frame 11 by tightening the nuts 19 on the ends of the U-bolts 17.

When properly secured in position the trunnions 13 provide support for a shaft 21 which passes through the openings 14. The shaft itself provides support for a sleeve 22 which is mounted on the shaft 21 for rotation with respect thereto between the trunnions 13. Parallel longitudinal frame members 23 are secured to the sleeve 22 for rotation therewith about the shaft 21 by means of U-bolts 24 depending from the sleeve 22 to hold the frame members 23 in fixed relative position with respect to the sleeve 22 when the nuts 26 are tightened against the plates 27. The longitudinal frame members 23 are held together adjacent the rearward extremities thereof by means of cross members 28 and curved extensions 29 of the frame members 23 which are joined adjacent their mid points by welding or other fastening means to a backwardly extending support 31. When in operative position, the support 31 curves downwardly toward the vehicle supporting ground and it is terminated at a point as necessary to assure the positioning of an overload axle 32 which passes through a supporting housing 33 at approximately the same height above the ground as the height of the drive axle 34 above the ground. Conventional wheel drums 36, bearings and the like are mounted on the outwardly disposed ends 37 of the overload axle 32 to make up a set of overload wheels 38 and tires 39, preferably of the same size as the tires 39 on the drive wheels 35, are mounted on the wheels 38.

From the foregoing construction it will be apparent that the overload wheels 38 will be in contact with the ground and that a portion of the load normally carried by the drive axle 34 may be distributed to the overload axle 32 by proper load application. In order to apply a portion of the load carried by a tractor 12 and trailer 15 to the overload axle 32, the present inventor mounts the conventional fifth wheel 40 which is provided for connecting the trailer 15 to the tractor 12 on the frame members 23. In this arrangement a portion of the load transmitted through the fifth wheel 40 will be carried by the overload axle 32 while the main load will be carried by the drive axle 34.

As shown in Figs. 1 and 3 one arrangement for mounting the fifth wheel 40 utilizes a pair of support flanges 41 placed on top of the frame members 23 and held in position by means of U-bolts 42, pressure plates 43 and nuts 44. The flanges 41 are provided with an opening 46 through which a shaft 47 passes. The shaft 47 also passes through flanges 48 depending downwardly from the underneath side of the slotted plate 49 which is the main structural element of the fifth wheel 40 to complete the conventional fifth wheel arrangement.

Since the nuts 44 may be loosened, the support flanges 41 may be moved along the frame member 23. As the supports are moved, the proportionate amount of the load transmitted through the fifth wheel 40, the shaft 47 and the supports 41 to the overload wheels 38 will be changed. Accordingly movement of the supports 41 backwardly toward the overload axle 32 will increase the load on this axle whereas forward movement will decrease the load carried by the axle 32. By proper adjustment and positioning of the shafts 21 and 47 the load carried may be distributed as desired between the axles 32 and 34, and when properly adjusted the overload wheels 38 will relieve the load on the drive axle 34 to the extent necessary to comply with the various State laws relative to axle loadings.

The overload axle 32 is relatively short for the embodiment shown. This allows the overload wheels 38 to run in and out-of-track position with respect to the wheels 35 on the drive axle 34. Accordingly the frame members 23 may be moved forwardly so that the overload wheels 38 and the drive wheels 35 will be in longitudinally overlapping position. When in overlapping position, and even in most cases when in a fully extended position, the use of the overload wheel arrangement of this invention does not necessitate lengthening the longitudinal dimension of the truck or tractor and trailer arrangement. Since the over-all length is not increased by addition of overload wheels in accordance with this arrangement, the length of the transport unit will not be increased beyond the limits prescribed by the State laws.

In order that the overload wheels 38 may be accurately aligned and oriented with respect to the forward direction of the tractor, the position of the adjusting block 16 may be changed through minor increments by use of the mechanism shown in Fig. 1. This arrangement utilizes a threaded rod 51 which is secured at one end to an extension 52 of the block 16. The rod extends backwardly through an opening in a flange 53 secured to the tractor frame 11, and lock nuts 54 are threadedly engaged on the rod 51 on both sides of the flange 53. By adjusting the position of the lock nuts 54 the rod 51 may be moved longitudinally to position the block 16 in its exact desired position. When correctly positioned the overload wheels 38 will follow the tractor without undue wear and side sway, and attendant wear will be reduced to a minimum.

An alternate arrangement for securing the trunnions 13 in position to assure the correct alignment of the overload axle 32 is shown in Fig. 6. In this figure it will be noted that the upper and lower surface of the frame 23 are extended beyond the sides thereof to provide flanges 56. These flanges 56 have a plurality of notches 57 cut therein at equally spaced positions so that the U-bolts 17 may be passed downwardly over the trunnions 13, the block 16 and through the notches 57 to correctly position the trunnion 13 along the frame 23. In this particular arrangement the placement of the notches 57 is originally arranged so that the overload axle 32 will be in correct alignment when the U-bolts 17 are engaged in the notches 57.

Though no spring or special shock absorbing structure is shown between the axle 32 and the point of attachment of the frame 23 to the truck frame 11, it will be apparent to those skilled in the art that such arrangements may be readily incorporated whenever necessary. Likewise it will be apparent that the present invention is adaptable to various modifications and changes. All such modifications and changes as are within the scope of the hereunto appended claims are deemed to be a part of this invention.

I claim:

1. An auxiliary overload axle assembly for load-carrying vehicles adapted to relieve excess weight from the main support axles and wheels thereof, comprising a frame one end of which is formed as a bifurcated section adapted to lie inside of and in substantially parallel relation to the main frame members of a vehicle to which it is attached, the opposite end of said frame being formed as a downwardly extending section terminating in an axle-supporting portion, an axle mounted in said portion, and a wheel mounted for rotation on said axle at each side of said portion.

2. An auxiliary overload axle assembly for load-carrying vehicles adapted to relieve excess weight from the main support axles and wheels thereof, comprising a frame one end of which is formed as a bifurcated section adapted to lie inside of and in substantially parallel relation to the main frame members of a vehicle to which it is attached, the opposite end of said frame being formed as a downwardly extending section terminating in an axle-supporting portion, an axle mounted in said portion, and a wheel mounted for rotation on said axle at each side of said portion, said wheels being the same size as the wheels of the vehicle to which it is attached.

3. An auxiliary overload axle assembly for load-carrying vehicles adapted to relieve excess weight from the main support axles and wheels thereof, comprising a frame one end of which is formed as a bifurcated section adapted to lie inside of and in substantially parallel relation to the main frame members of a vehicle to which it is attached, the opposite end of said frame being formed as a downwardly extending section terminating in an axle-supporting portion, an axle mounted in said portion, and a wheel mounted for rotation on said axle at each side of said portion, said wheels being supported on said axle in such closely spaced relation as to travel in paths lying within the paths of travel of the drive wheels of the vehicle to which the unit is attached.

4. An auxiliary overload axle assembly for load-carrying vehicles adapted to relieve excess weight from the main support axles and wheels thereof, comprising a frame one end of which is formed as a bifurcated section adapted to lie inside of and in susbtantially parallel relation to the main frame members of a vehicle to which it is attached, the opposite end of said frame being formed as a downwardly extending section terminating in an axle-supporting portion, an axle mounted in said portion, and a wheel mounted for rotation on said axle at each side of said portion, the axle-supporting frame section extending downwardly a distance sufficient to maintain the auxiliary axle in horizontal alignment with the drive axle of the vehicle to which the unit is attached when the bifurcated members are held in a plane parallel with the main frame members of said vehicle.

5. An auxiliary overload axle assembly for load-carrying vehicles adapted to relieve excess weight from the main support axles and wheels thereof, comprising spaced frame members arranged to lie in adjoining relation to a tractor frame, means including a horizontally-disposed pivot for connecting said frame members to the tractor frame for angular movement in a vertical plane relative to said frame, said horizontally-disposed pivot structure comprising aligned trunnions adapted to be supported on parallel members of the tractor frame, a shaft journaled in said trunnions, and a sleeve disposed on the shaft for attachment to said auxiliary assembly, a wheel-supported axle extending from the frame members rearwardly of the pivotal connection, a fifth wheel assembly mounted for lengthwise movement along said frame, and means for fastening said assembly at selected positions lengthwise of the frame.

References Cited in the file of this patent

UNITED STATES PATENTS

| Number | Name | Date |
| --- | --- | --- |
| 1,450,554 | Kreissle | Apr. 3, 1923 |
| 1,589,016 | Liedabrand | June 15, 1926 |
| 2,330,897 | Kirksey | Oct. 5, 1943 |